United States Patent Office 3,299,177
Patented Jan. 17, 1967

3,299,177
POLYETHYLENE MODIFIED WITH BRANCHED POLYETHYLENE WAX
Frederick P. Reding, Charleston, W. Va., assignor to Union Carbide Corporation, a corporation of New York
No Drawing. Filed Oct. 1, 1962, Ser. No. 227,537
10 Claims. (Cl. 260—878)

This invention relates to modified polyethylene having improved physical properties. More particularly, this invention relates to modified polyethylene prepared by polymerizing ethylene in the presence of a small amount of a highly branched, low molecular weight polyethylene wax.

Conventional polyethylene prepared by a free radical initiated high pressure process is extensively used for insulating high frequency electrical cables. However, unless the polyethylene employed is of high molecular weight, i.e. having a melt index below about 0.1, it is characterized by rather poor crack resistance and environmental stress rupture properties, and readily cracks when subjected to externally applied stress. While the high molecular weight polymers are characterized by rather good crack resistance and environmental stress rupture properties, such polymers are difficult to process because of their undesirable rheological properties. This is particularly true in the extrusion of cable sheaths.

Thus there exists a strong-felt need for a polyethylene resin which is easily processable, and which at the same time possesses the excellent crack resistance and environmental stress rupture properties which are characteristics of only the high molecular weight polymers. Such a resin would be extremely valuable, for example, in sheathing high frequency electrical cables, and in other similar uses where the resin is subject to a large measure of externally applied stress.

It has been discovered, in accordance with the instant invention, that polyethylene having both good processability and exceptional resistance to environmental stress cracking can be prepared by polymerizing ethylene in contact with a small amount of a highly branched, low molecular weight polyethylene wax. The polyethylene produced by such procedure is generally characterized by a higher resistance to cracking than is polyethylene of the same melt index produced in the same manner but in the absence of polyethylene wax. It is noteworthy that the use of this polyethylene wax has no significant detrimental effect on the other physical properties of the final product, such as, for example, stiffness, tensile strength, elongation and dielectric strength, heat and light stability, et cetera, and in many instances actually improves such properties.

The polyethylene produced by the process of the instant invention is believed to be a graft copolymer of the polyethylene wax and the newly polymerized polyethylene. In any event, it is evident that the two resins are chemically combined since the product possesses superior crack resistance than a mere mechanical mixture of the same resins, and the two resins cannot be separated by chemical or physical means.

The modified polyethylene of the instant invention can be produced by polymerizing ethylene in the presence of a small amount of a highly branched, low molecular weight polyethylene wax, and a free radical initiator, at a pressure of from about 15,000 p.s.i. to about 65,000 p.s.i., preferably from about 20,000 p.s.i. to about 40,000 p.s.i., and at a temperature of from about 160° C. to about 260° C., preferably from about 180° C. to about 230° C. Polymerization can be conducted in either a batchwise or continuous manner. When polymerization is conducted continuously in a tubular reactor, the low molecular weight polyethylene wax can be continuously admitted at any point along the reactor. The greatest improvement in crack resistance is obtained when the wax is continuously admitted to the reactor at a point of from about 50 percent to about 90 percent of the linear distance from the point of entry of the ethylene gas into the reactor to the point of exit of the final product from the reactor.

The polyethylene wax employed in the process of the instant invention should be a highly branched resin having a flow rate of from about 50 decigrams per minute to about 500 decigrams per minute, preferably from about 110 decigrams per minute to about 360 decigrams per minute, a density at 23° C. of from about 0.80 gram/cc. to about 0.92 gram/cc., preferably from about 0.85 gram/cc. to about 0.90 gram/cc., and a specific viscosity in methylcyclohexane at 70° C. of from about 0.05 to about 0.15, preferably from about 0.08 to about 0.11. Such resins can be prepared by the well known free radical initiated high pressure process.

In order to obtain the advantages disclosed, the final product should have a combined wax content of from about 5 percent by weight to about 20 percent by weight, preferably from about 6 percent by weight to about 12 percent by weight, and a melt index of from about 0.002 decigram per minute to about 3.0 decigrams per minute, preferably from about 0.03 decigram per minute to about 1.0 decigram per minute. Since the conversion of ethylene will vary with such factors as the amount of diluent, pressure, temperature, catalyst, and the like, it is obvious that the amount of wax employed should be regulated depending upon these factors in order to produce a product having the desired wax content. Usually the desired products can be obtained by employing the wax in the reaction mixture in an amount of from about 0.5 percent by weight to about 10 percent by weight, preferably from about 1 percent by weight to about 5 percent by weight, based on the amount of ethylene used.

The polyethylene wax employed in the process of the instant invention may be employed in a molten condition or dissolved in an inert liquid solvent. By an inert liquid solvent is meant a liquid solvent which is essentially nonreactive under the conditions of the reaction. Suitable inert liquid solvents which can be employed include saturated aliphatic hydrocarbons such as hexane, heptane, isooctane, highly purified kerosene, and the like; saturated cycloaliphatic hydrocarbons such as cyclohexane, methylcyclohexane, and the like; and aromatic hydrocarbons such as benzene, toluene, xylene, and the like. In general, an amount of solvent ranging from 1 to 20 times, preferably from about 2 to 5 times, the weight of polyethylene wax employed can be effectively used. However, in order to minimize the lowering of polymer molecular weight by chain transfer, and to maintain high resin productivity, the amount of solvent is best kept below 10 percent by weight, preferably below 5 percent by weight, of the total feed.

Polymerization according to the process of the instant invention is promoted by a free radical initiator, including, for example, oxygen, peroxides, percarbonates, peresters, and azo compounds. Among the peroxides which can be employed as initiators may be mentioned hydrogen peroxide, diethyl peroxide, dibenzoyl peroxide, distearyl peroxide, di-tertiary-butyl peroxide, di-tertiary-butyl hydroperoxide, diacetyl peroxide, distearoyl peroxide, and acetyl benzoyl peroxide. Specific examples of the azo compounds which can be employed include $\alpha,\alpha'$-azo-bis-isobutyronitrile and 2,2'-dicyanoazobenzene. Illustrative of the percarbonates which can be employed are diisopropyl percarbonate and di-tertiary-butyl percarbonate, while a typical perester would be acetaldehyde monoperacetate. Such initiators are employed in amounts which are conventionally employed by the art. Thus such initiators can be employed in an amount of from about 5 p.p.m. to about 500 p.p.m., preferably from about 20 p.p.m. to about 200 p.p.m., based on the amount of ethylene employed.

The following examples are set forth for purposes of illustration so that those skilled in the art may better understand this invention, and it should be understood that they are not to be construed as limiting this invention in any manner. The polymers of said examples were evaluated in accordance with the following testing techniques:

*Melt index.*—The rate at which a polymer is extruded through a die having a diameter of 0.0825 inch in accordance with the procedure is ASTM test procedure D–1238–52T. This property is expressed in decigrams per minute.

*Melt flow or flow rate.*—Similar to the melt index test but is determined at 1.15 p.s.i. and 125° C. This property is also expressed in decigrams per minute.

*Density.*—Determined in accordance with the density gradient technique described in ASTM test procedure D–1505–60T, method A, using methanol and an aqueous sodium acetate solution as the liquid density gradient at a temperature of 23° C. This property is expressed in grams/cc.

*Specific viscosity.*—The ratio of the viscosity of a solution of 0.4 gram of polyethylene in 100 milliliters of solvent to the viscosity of the solvent. Measurements were made on a Ubbelohde viscosimeter at a temperature of 70° C. or 80° C. employing methylcyclohexane as solvent.

*Crack resistance.*—Determined in accordance with an accelerated version of proposed ASTM test method D–1248–58T. The test is run on 1.5" x 0.5" x 0.125" polymer specimens obtained from compression molded plaques of the polymer. A slit 0.75" long and 0.020 to 0.025" deep is cut into the broad surface of each specimen by means of a special jig, and the specimen is bent along the slit (with the slit on the surface of the bend) until the two opposite surfaces meet. Each bent specimen is then immersed in this stressed condition in a test tube containing a surface-active agent, such as Igepal CA–630 (an alkyl phenoxy polyoxyethylene ethanol) or Hostapal HL (a mixture containing 50 percent by weight of an alkyl phenoxy polyoxyethylene ethanol, 25 percent by weight of t-butanol, and 25 percent by weight of water). The surface-active agent is maintained at a temperature of 50° C. The time in hours required to produce the first visible evidence of cracking is taken as the crack resistance. In the accelerated version of the test, the sample is aged in an air oven for one week at a temperature of 70° C. before being immersed in the surface-active agent at 50° C. The time in hours required to produce the first visible crack in the sample is reported as the crack resistance value.

*Example I*

A 1.5-liter autoclave was charged with 600 grams of benzene, and 2.5 milliliters of a solution of 5 percent by weight of di-tertiary-butyl peroxide in benzene. The autoclave was purged of air by successively pressurizing it to 50 p.s.i.g. with ethylene and venting it to atmospheric pressure three times. The autoclave was then pressurized to 2,000 p.s.i. with ethylene containing less than 10 p.p.m. oxygen. Agitation of the autoclave was commenced, and the contents thereof were heated to and maintained at a temperature of 170° C. Ethylene was then added to the autoclave until a pressure of 15,000 p.s.i. was attained. From time to time, as the pressure diminished due to polymerization of ethylene, more ethylene was added to maintain the pressure at 15,000 p.s.i. The reaction was allowed to proceed for 1.83 hours. At the end of this time, the autoclave was cooled and vented. The contents of the autoclave were filtered, and the polyethylene resin collected was washed three times with methanol and dried. The dried polyethylene, which weighed 93 grams, had a melt index of 1.59 decigrams per minute, a specific viscosity of 0.535 in methylcyclohexane at 70° C., and a crack resistance of only 27 to 29 minutes in an accelerated crack resistance test in Igepal CA–630.

*Example II*

A 1.5-liter autoclave was charged with 487.5 grams of benzene, 12.5 grams of polyethylene wax, and 2.3 milliliters of a solution of 5 percent by weight of di-tertiary-butyl peroxide in benzene. The polyethylene wax was prepared by a free radical initiated high pressure process, and had a flow rate of about 270 decigrams per minute, a density of 0.888 gram/cc. at 23° C., and a specific viscosity of 0.083 in methylcyclohexane at 70° C. The autoclave was purged of air by successively pressurizing it to 50 p.s.i.g. with ethylene and venting it to atmospheric pressure three times. The autoclave was then pressurized to 2,500 p.s.i. with ethylene containing less than 10 p.p.m. oxygen. Agitation of the autoclave was commenced, and the contents thereof were heated to and maintained at a temperature of 160° C. Ethylene was then added to the autoclave until a pressure of 15,000 p.s.i. was attained. From time to time, as the pressure diminished due to polymerization of ethylene, more ethylene was added to maintain the pressure at 15,000 p.s.i. The reaction was allowed to proceed for 38 minutes. At the end of this time, the autoclave was cooled and vented. The contents of the autoclave were filtered, and the polyethylene resin collected was washed three times with methanol and dried. The dried polyethylene, which weighed 132 grams, contained 9.5 percent by weight of chemically combined polyethylene wax, had a melt index of 0.62 decigram per minute, a specific viscosity of 0.631 in methylcyclohexane at 70° C., and a crack resistance of greater than 1,000 hours in an accelerated crack resistance test in Igepal CA–630.

When 10 parts by weight of the polyethylene wax employed in the above-described polymerization was milled on a two-roll mill for about 15 minutes at a temperature of about 150° C. with 30 parts by weight of a polyethylene resin having a density of 0.919 gram/cc. at 23° C. and a melt index of 0.3 decigram per minute, and 60 parts of weight of a polyethylene resin having a density of 0.922 gram/cc. at 23° C. and a melt index of 0.08 decigram per minute, the resultant blend had a melt index of 0.351 decigram per minute and a crack resistance of less than 28 hours in an accelerated crack resistance test in Igepal CA–630.

*Example III*

Commercial ethylene, having a minimum purity of 95 mole percent, and containing methane, ethane and 51 p.p.m. of oxygen, was continuously polymerized by passing it through a 48-foot long jacketed reactor having an inner diameter of 3/16 inch under an average pressure of 35,000 p.s.i. at a rate of 29 pounds per hour. The reactor was maintained at a temperature of 252° C. About 4.24 pounds of polymer were produced per hour. The polymerized ethylene which emerged from the reactor was discharged into 2,000 grams of methanol which contained 0.25 gram of di-tertiary-butyl-para-cresol as an antioxidant. The product was washed three times with methanol, filtered, and dried. The dried polyethylene, which weighed 962 grams, had a melt index of 1.36 decigrams per minute, a density of 0.9165 gram/cc. at 23° C., a specific viscosity of 0.480 in methylcyclohexane at 80° C., and a crack resistance of less than 24 minutes in an accelerated crack resistance test in Igepal CA–630.

*Example IV*

Commercial ethylene containing 5.2 mole percent ethane, 0.2 mole percent methane, 0.5 mole percent carbon dioxide and 31 p.p.m. of oxygen, was continuously fed together with a solution of 11.7 percent by weight of polyethylene wax in toluene, through a 48-foot long jacketed reactor having an inner diameter of 3/16 inch under a pressure of 35,000 p.s.i. The ethylene was fed at a rate of 22.3 pounds per hour and the solution was fed at a rate sufficient to provide 0.18 pound of wax per hour. The polyethylene wax was prepared by a free radical initiated high pressure process, and had a flow rate of about 270 decigrams per minute, a density of 0.888 gram/cc. at 23° C., and a specific viscosity of 0.083 in methylcyclohexane at 80° C. The reactor was maintained at a temperature of 190° C. About 1.86 pounds of polymer were produced per hour. The polymerized ethylene which emerged from the reactor was discharged into 2,000 grams of methanol which contained 0.25 gram of di-tertiary-butyl-para-cresol as an antioxidant. The product was washed three times with methanol, filtered, and dried. The dried polyethylene contained 9.5 percent by weight of chemically combined polyethylene wax, had a melt index of 0.420 decigram per minute, a density of 0.9234 gram/cc. at 23° C., a specific viscosity of 0.571 in methylcyclohexane at 80° C., and a crack resistance of greater than 924 hours in an accelerated crack resistance test in Igepal CA–630, and greater than 1296 hours in Hostapol HL.

When the procedure is repeated while varying the point of entry of the polyethylene wax to the reactor, the greatest improvement in crack resistance is obtained by continuously admitting the wax to the reactor at a point of from 24 to 43 feet from the point of entry of the ethylene gas.

What is claimed is:

1. A process for producing modified polyethylene which comprises polymerizing ethylene in contact with a free radical initiator and a pre-formed, highly branched, low molecular weight polyethylene wax, said polyethylene wax having a flow rate of from about 50 decigrams per minute to about 500 decigrams per minute, a density of from about 0.80 gram/cc. to about 0.92 gram/cc. at 23° C., and a specific viscosity in methylcyclohexane at 70° C. of from about 0.05 to about 0.15 so as to produce a modified polyethylene having a melt index of from about 0.002 decigram per minute to about 3.0 decigrams per minute and containing from about 5 percent by weight to about 20 percent by weight of chemically combined polyethylene wax.

2. A process as in claim 1 wherein polymerization is conducted in a tubular reactor.

3. A process as in claim 2 wherein the low molecular weight polyethylene wax is continuously admitted to the reactor at a point of from about 50 percent to about 90 percent of the linear distance from the point of entry of the ethylene gas into the reactor to the point of exit of the final product from the reactor.

4. A process as in claim 1 wherein the polyethylene wax is employed in an amount of from about 0.5 percent by weight to about 10 percent by weight of the ethylene used.

5. A process for producing modified polyethylene which comprises polymerizing ethylene in contact with a free radical initiator and a pre-formed, highly branched, low molecular weight polyethylene wax at a temperature of from about 160° C. to about 260° C. and at a pressure of from about 15,000 p.s.i. to about 65,000 p.s.i., said polyethylene wax having a flow rate of from about 50 decigrams per minute to about 500 decigrams per minute, a density of from about 0.80 gram/cc. to about 0.92 gram/cc. at 23° C., and a specific viscosity in methylcyclohexane at 70° C. of from about 0.05 to about 0.15, so as to produce a modified polyethylene having a melt index of from about 0.002 decigram per minute to about 3.0 decigrams per minute and containing from about 5 percent by weight to about 20 percent by weight of chemically combined polyethylene wax.

6. A process as in claim 5 wherein the polyethylene wax is employed in an amount of from about 0.5 percent by weight to about 10 percent by weight of the ethylene used.

7. A process for producing modified polyethylene which comprises polymerizing ethylene in contact with a free radical initiator and a pre-formed, highly branched, low molecular weight polyethylene wax at a temperature of from about 160° C. to about 260° C. and at a pressure of from about 15,000 p.s.i. to about 65,000 p.s.i., said polyethylene wax having been prepared by a free radical initiated high pressure process and having a flow rate of from about 50 decigrams per minute to about 500 decigrams per minute, a density of from about 0.80 gram/cc. to about 0.92 gram/cc. at 23° C., and a specific viscosity in methylcyclohexane at 70° C. of from about 0.05 to about 0.15, so as to produce a modified polyethylene having a melt index of from about 0.002 decigram per minute to about 3.0 decigrams per minute and containing from about 5 percent by weight to about 20 percent by weight of chemically combined polyethylene wax.

8. A process as in claim 7 wherein the polyethylene wax is employed in an amount of from about 0.5 percent by weight to about 10 percent by weight of the ethylene used.

9. A process for producing modified polyethylene which comprises polymerizing ethylene in contact with a free radical initiator and a pre-formed, highly branched, low molecular weight polyethylene wax dissolved in an inert liquid solvent at a temperature of from about 160° C. to about 260° C. and at a pressure of from about 15,000 p.s.i. to about 65,000 p.s.i., said polyethylene wax having been prepared by a free radical initiated high pressure process and having a flow rate of from about 50 decigrams per minute to about 500 decigrams per minute, a density of from about 0.80 gram/cc. to about 0.92 gram/cc. at 23° C., and a specific viscosity in methylcyclohexane at 70° C. of from about 0.05 to about 0.15, so as to produce a modified polyethylene having a melt index of from about 0.002 decigram per minute to about 3.0 decigrams per minute and containing from about 5 percent by weight to about 20 percent by weight of chemically combined polyethylene wax.

10. A process as in claim 9 wherein the polyethylene wax is employed in an amount of from about 0.5 percent by weight to about 10 percent by weight of the ethylene used.

References Cited by the Examiner

UNITED STATES PATENTS 2,542,771   2/1951   Hanford et al. _____ 260—878
2,897,183   7/1959   Christl et al. _____ 260—94.9

MURRAY TILLMAN, *Primary Examiner.*

LEON J. BERCOVITZ, J. A. KOLASCH, D. BREZNER,
*Assistant Examiners.*